United States Patent
Shibata (10) Patent No.: US 9,547,913 B2
(45) Date of Patent: Jan. 17, 2017

(54) INFORMATION PROCESSING DEVICE, INFORMATION PROCESSING APPARATUS, INFORMATION PROCESSING METHOD, AND PROGRAM

(71) Applicant: NEC Corporation, Tokyo (JP)

(72) Inventor: Takashi Shibata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/845,462

(22) Filed: Sep. 4, 2015

(65) Prior Publication Data

US 2016/0071285 A1    Mar. 10, 2016

(30) Foreign Application Priority Data

Sep. 9, 2014  (JP) .................................. 2014-182815

(51) Int. Cl.
*G06T 7/00*  (2006.01)
*G06T 7/20*  (2006.01)

(52) U.S. Cl.
CPC ............. *G06T 7/204* (2013.01); *G06T 7/0087* (2013.01); *G06T 7/206* (2013.01); *G06T 2207/20048* (2013.01); *G06T 2207/20212* (2013.01)

(58) Field of Classification Search
None
See application file for complete search history.

(56) References Cited

FOREIGN PATENT DOCUMENTS

JP   WO 2011083665 A1 *  7/2011 ........... G06K 9/6203
WO  WO 2011/083665 A1   7/2011

* cited by examiner

*Primary Examiner* — Stephen R Koziol
*Assistant Examiner* — Delomia L Gilliard
(74) *Attorney, Agent, or Firm* — Foley & Lardner LLP (57) ABSTRACT

An information processing device, apparatus, method and non-transitory computer-readable storage medium are disclosed. An information processing device may include a memory storing instructions, and at least one processor configured to process the instructions to generate a comparison image by transforming a reference image, associate the comparison image with a class variable representing an object included in the reference image, calculate a degree of difference between an input patch which is an image representing a sub-region of an input image and a comparison patch which is an image representing a sub-region of the comparison image, estimate a displacement vector between the input patch and the comparison patch, calculate a first degree of reliability corresponding to the displacement vector and the class variable on the basis of the displacement vector and the degree of difference, calculate a second degree of reliability for each comparison patch on the basis of the first degree of reliability, and identify the object is represented by the class variable associated with the comparison image including the comparison patch whose second degree of reliability is greater than a predetermined threshold value, as a recognition target.

18 Claims, 7 Drawing Sheets

FIG. 3

| | CLASS VARIABLE (1) | | | | | | |
|---|---|---|---|---|---|---|---|
| | 1 | 2 | 3 | 4 | 5 | ... | N |
| $(x_1, y_1)$ | 0 | 0 | 0 | 0 | 0 | ... | 0 |
| $(x_2, y_2)$ | 0 | 1.5 | 0 | 1.3 | 0 | ... | 0 |
| $(x_3, y_3)$ | 0 | 0 | 5.0 | 0 | 0.2 | ... | 0 |
| $(x_4, y_4)$ | 0 | 0 | 0 | 0 | 0 | ... | 0 |
| $(x_5, y_5)$ | 0 | 2.0 | 0 | 0 | 0 | ... | 0 |
| ⋮ | ⋮ | ⋮ | ⋮ | ⋮ | ⋮ | ... | ⋮ |
| $(x_N, y_N)$ | 0 | 0 | 0 | 0 | 0 | ... | 0 |

DISPLACEMENT VECTOR (u)

INFORMATION PROCESSING DEVICE, INFORMATION PROCESSING APPARATUS, INFORMATION PROCESSING METHOD, AND PROGRAM

CROSS-REFERENCE TO RELATED PATENT APPLICATIONS

This application is based upon and claims the benefit of priority from Japanese Patent Application No. 2014-182815, filed on Sep. 9, 2014. The entire disclosure of the above-referenced application is incorporated herein by reference.

BACKGROUND

1. Technical Field

The present disclosure generally relate to image recognition.

2. Description of the Related Art

Image recognition in a digital image, such as recognition of people, characters, or objects existing in the digital image may be widely performed. A template matching technique may be one of recognition techniques for digital images. In the template matching technique, a target object included in an image may be identified (recognized) based on the degree of similarity between a recognition target in the image and an image for reference, referred to as a template image.

In some aspects, the position and direction of the target object in the image may not be fixed. For example, when a character in a landscape image is to be recognized, the shape of the character may be recognized as being geometrically transformed in such a way that the gradient of the character may be recognized as being changed. When the recognition target image is recognized as being geometrically transformed compared to the template image, the appearance of the template image and the appearance of the recognition target image may differ from each other. In such a case, the accuracy of matching may decrease in the template matching technique.

In some aspects, there may be a method for solving this decrease.

A degree-of-similarity calculating device in a related technique may include a displacement vector estimating part, a geometric transformation parameter estimating part, a displacement vector correcting part, a voting part, a peak detecting part, and a degree-of-similarity calculating part. The degree-of-similarity calculating device may operate as described below. In some aspects, the displacement vector estimating part may estimate a displacement vector between a first sub-region set in a first image and a second sub-region most similar to the first sub-region in a second image. The geometric transformation parameter estimating part may estimate a geometric transformation parameter by which the first image is geometrically transformed to the second image, based on multiple displacement vectors. The displacement vector correcting part may subtract displacement based on the geometric transformation from each of the displacement vectors, on the basis of the geometric transformation parameter, and thereby correct the displacement vectors. The voting part may perform voting for the displacement vectors corrected by the displacement vector correcting part in a two-dimensional space determined based on elements of the displacement vectors. The peak detecting part may detect a peak on the two-dimensional space in which the voting is performed. The degree-of-similarity calculating part may calculate the degree of similarity between the first image and the second image based on the magnitude of the peak. The degree-of-similarity calculating device in the related technique may identify (recognize) the target object by using the calculated degree of similarity.

In the degree-of-similarity calculating device in the related technique, it may be assumed that the image quality of the recognition target image is sufficiently high, i.e. the image may have high resolution. Further, in the degree-of-similarity calculating device in the related technique, it may be assumed that the geometric transformation from the template image is the cause of image degradation.

In some aspects, there may be many causes of image degradation, other than the geometric transformation. For example, causes of degradation in recognition of characters in a landscape image may include decrease of resolution of a captured object, generation of blur, and compression noise or sensor noise in an image, in addition to the geometric transformation.

Further, appearance of a template pattern of one class (for example, a certain type of character) in the recognition target image may be sometimes similar to appearance of a template pattern of another class (for example, another type of character) due to the causes of degradation described above. In such a case, the related technique may be difficult to identify the template image corresponding to the recognition target image from the template images.

SUMMARY OF THE DISCLOSURE

Exemplary embodiments of the present disclosure overcome the above disadvantages and other disadvantages not described above. Also, the present exemplary embodiments are not required to overcome the disadvantages described above, and an exemplary embodiment of the present disclosure may not overcome any of the problems described above.

According to a first aspect of the present disclosure, an information processing apparatus includes a memory storing instructions, and at least one processor configured to process the instructions to generate a comparison image by transforming a reference image, associate the comparison image with a class variable representing an object included in the reference image, calculate a degree of difference between an input patch which is an image representing a sub-region of an input image and a comparison patch which is an image representing a sub-region of the comparison image, estimate a displacement vector between the input patch and the comparison patch, calculate a first degree of reliability corresponding to the displacement vector and the class variable on the basis of the displacement vector and the degree of difference, calculate a second degree of reliability for each comparison patch on the basis of the first degree of reliability, and identify the object is represented by the class variable associated with the comparison image including the comparison patch whose second degree of reliability is greater than a predetermined threshold value, as a recognition target.

An information processing method according to another aspect of the present disclosure may include generating a comparison image by transforming a reference image, associating the comparison image with a class variable representing an object included in the reference image, calculating a degree of difference between an input patch which is an image representing a sub-region of an input image and a comparison patch which is an image representing a sub-region of the comparison image, estimating a displacement vector between the input patch and the comparison patch, calculating a first degree of reliability corresponding to the displacement vector and the class variable on the basis of the displacement vector and the degree of difference, calculating a second degree of reliability for each comparison patch on the basis of the first degree of reliability, and identifying the object is represented by the class variable associated with the comparison image including the comparison patch whose second degree of reliability is greater than a predetermined threshold value, as a recognition target.

A non-transitory computer-readable storage medium may store instructions that when executed by a computer enable the computer to implement a method. The method may include generating a comparison image by transforming a reference image, associating the comparison image with a class variable representing an object included in the reference image, calculating a degree of difference between an input patch which is an image representing a sub-region of an input image and a comparison patch which is an image representing a sub-region of the comparison image, estimating a displacement vector between the input patch and the comparison patch, calculating a first degree of reliability corresponding to the displacement vector and the class variable on the basis of the displacement vector and the degree of difference, calculating a second degree of reliability for each comparison patch on the basis of the first degree of reliability, and identifying the object is represented by the class variable associated with the comparison image including the comparison patch whose second degree of reliability is greater than a predetermined threshold value, as a recognition target.

DETAILED DESCRIPTION

In the following detailed description numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawings.

First Exemplary Embodiment

A first exemplary embodiment will be described with reference to the drawings.

An information processing device of the exemplary embodiment may calculate degrees of reliability of sub-regions in an input image and determine class variables corresponding to the sub-regions, based on the degrees of reliability of the sub-regions.

[Description of Configuration]

A configuration of the first exemplary embodiment will be described with reference to the drawings.

Figure 1:
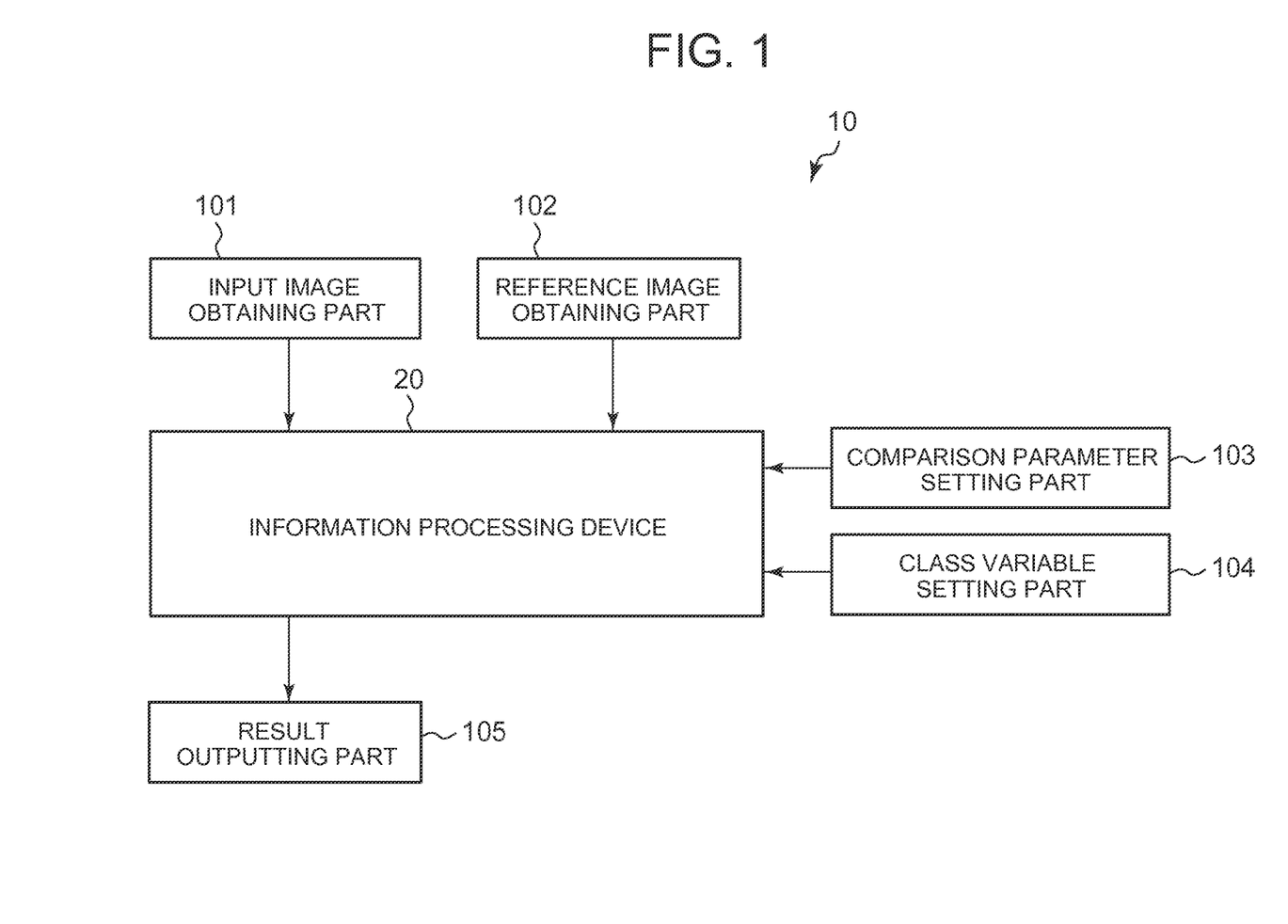
FIG. 1 is a block diagram illustrating an example of a configuration of an information processing apparatus including an information processing device according to at least one exemplary embodiment.

FIG. 1 is a block diagram illustrating an example of a configuration of an information processing apparatus 10 including an information processing device 20 according to at least one exemplary embodiment.

The information processing apparatus 10 may include the information processing device 20, an input image obtaining part 101, a reference image obtaining part 102, a comparison parameter setting part 103, a class variable setting part 104, and a result outputting part 105.

The input image obtaining part 101 may obtain the input image. The input image may be an image which is a target of image processing (image recognition) performed by the information processing device 20 as described below. A device providing the input image may not be limited to a particular device. For example, the input image obtaining part 101 may obtain the input image from an image capturing device (for example, a camera or a scanner). For example, the input image obtaining part 101 may obtain the input image stored in advance in a storage device. The input image obtaining part 101 may output (transmit) the obtained input image to the information processing device 20. The input image obtaining part 101 may store the obtained input image in a storage unit (for example, a memory). In some aspects, the information processing device 20 may fetch the input image from the storage unit. In other aspects, the input image obtaining part 101 may directly or indirectly output the input image to the information processing device 20.

The reference image obtaining part 102 may obtain a reference image. The reference image may be an image used by the information processing device 20 as described below, as a reference in the image recognition. A device providing the reference image may not be limited to a particular device. For example, the reference image obtaining part 102 may obtain the reference image from the image capturing device (for example, a camera or a scanner). For example, the reference image obtaining part 102 may obtain the reference image stored in advance in the storage device. The reference image obtaining part 102 may output (transmit) the obtained reference image to the information processing device 20. The reference image obtaining part 102 may store the obtained reference image in the storage unit. In some aspects, the information processing device 20 may fetch the reference image from the storage unit. In other aspects, the reference image obtaining part 102 may directly or indirectly output the reference image to the information processing device 20.

The comparison parameter setting part 103 may set (transmit) a comparison parameter used in processing of the information processing device 20 as described below, for the information processing device 20. The comparison parameter may be a parameter used in the processing of the information processing device 20 as described below. A user of the information processing device 20 may set the comparison parameter in the comparison parameter setting part 103 in advance. Further, the comparison parameter setting part 103 or a parameter calculating part may estimate the comparison parameter, based on the input image. The comparison parameter setting part 103 may store the received or calculated comparison parameter in a storage unit. In some aspects, the information processing device 20 may fetch the comparison parameter from the storage unit. In other aspects, the comparison parameter setting part 103 may directly or indirectly output the comparison parameter to the information processing device 20. The comparison parameter may be described in detail below.

The class variable setting part 104 may set (transmit) the class variables linked to (associated with) the reference image, for the information processing device 20.

The "class variables" herein may be variables for distinguishing (classifying) recognition target images. For example, when the recognition target images are character images, the class variables may be variables for distinguishing characters. For example, when the values of the class variables for alphabets (e.g., "A", "B", "C", ...) start from one and increase in increments of one, the class variables may be as described below. The first class variable may be a class variable for the character "A". The second class variable may be a class variable for the character "B". The third class variable may be a class variable for the character "C".

In some instances, when the recognition target images are images of human faces, the class variables may be variables for distinguishing faces of individual people. For example, when people who are targets of recognition are Alice, Bob, Carol, and Dave, the class variables may be as described below. The first class variable may be a class variable for "Alice". The second class variable may be a class variable for "Bob". The third class variable may be a class variable for "Carol". The fourth class variable may be a class variable for "Dave".

The information processing device 20 may use the class variables for the recognition (identification) of target objects as described below.

When the reference image is stored in the storage unit, the class variable setting part 104 may store the class variables in the storage unit. In some aspects, the information processing device 20 may fetch the class variables from the storage unit. In other aspects, the class variable setting part 104 may directly or indirectly output the class variables to the information processing device 20.

In some aspects, the user of the information processing device 20 or the provider of the reference image may set the class variables to be associated with the reference image, for the class variable setting part 104, when the reference image obtaining part 102 obtains the reference image. In other aspects, the class variable setting part 104 or an image recognition part may estimate the class variables by using the reference image. In the following description, the class variables may be sometimes simply referred to as "classes". The class variables may be sometimes referred to as "IDs (Identifiers)".

The reference image obtaining part 102 may receive the reference image including the class variables. In some aspects, the reference image obtaining part 102 may implement the function of the class variable setting part 104. In some aspects, the information processing apparatus 10 may include no class variable setting part 104.

The result outputting part 105 may output the identification result obtained by the information processing device 20 as described below to a device outside the information processing apparatus 10 (for example, a device requesting the information processing device 20 of the image recognition). An output of the result outputting part 105 in the exemplary embodiment may not be limited to a particular output. For example, the result outputting part 105 may output the class variables obtained as the identification result of the information processing device 20 as described below. For example, the result outputting part 105 may output scores of the class variables calculated by the information processing device 20 as described below. The information processing device 20 may store the identification result in the storage unit. In some aspects, the result outputting part 105 may fetch the identification result from the storage unit. In other aspects, the result outputting part 105 may directly or indirectly receive the identification result from the information processing device 20.

The information processing device 20 may perform identification (recognition) of the input image by using the reference image, the comparison parameter, and the class variables. In some aspects, the information processing device 20 may identify the class variables relating to sub-regions of the input image.

In the following description, the input image may be described as an image with an image quality lower than that of the reference image. In other words, in the following description, the input image may be an image with an image quality lower than that of the reference image. In other aspects, the reference image may be an image with an image quality higher than that of the input image. In the following description, the input image may also be referred to as low quality image. The reference image may also be referred to as high quality image.

A standard for determining the image quality may not be limited to a particular standard. For example, the standard for determining the image quality may be the resolution, the brightness, the chroma, or a degree of blur of the image.

The target of the processing of the information processing device 20 in the exemplary embodiment may not be limited to processing related to the image quality. When the information processing device 20 performs processing based on an item other than the quality of the input image, the input image may not be necessarily an image with a quality lower than that of the reference image.

A configuration of the information processing device 20 will be described with reference to the drawings.

Figure 2:
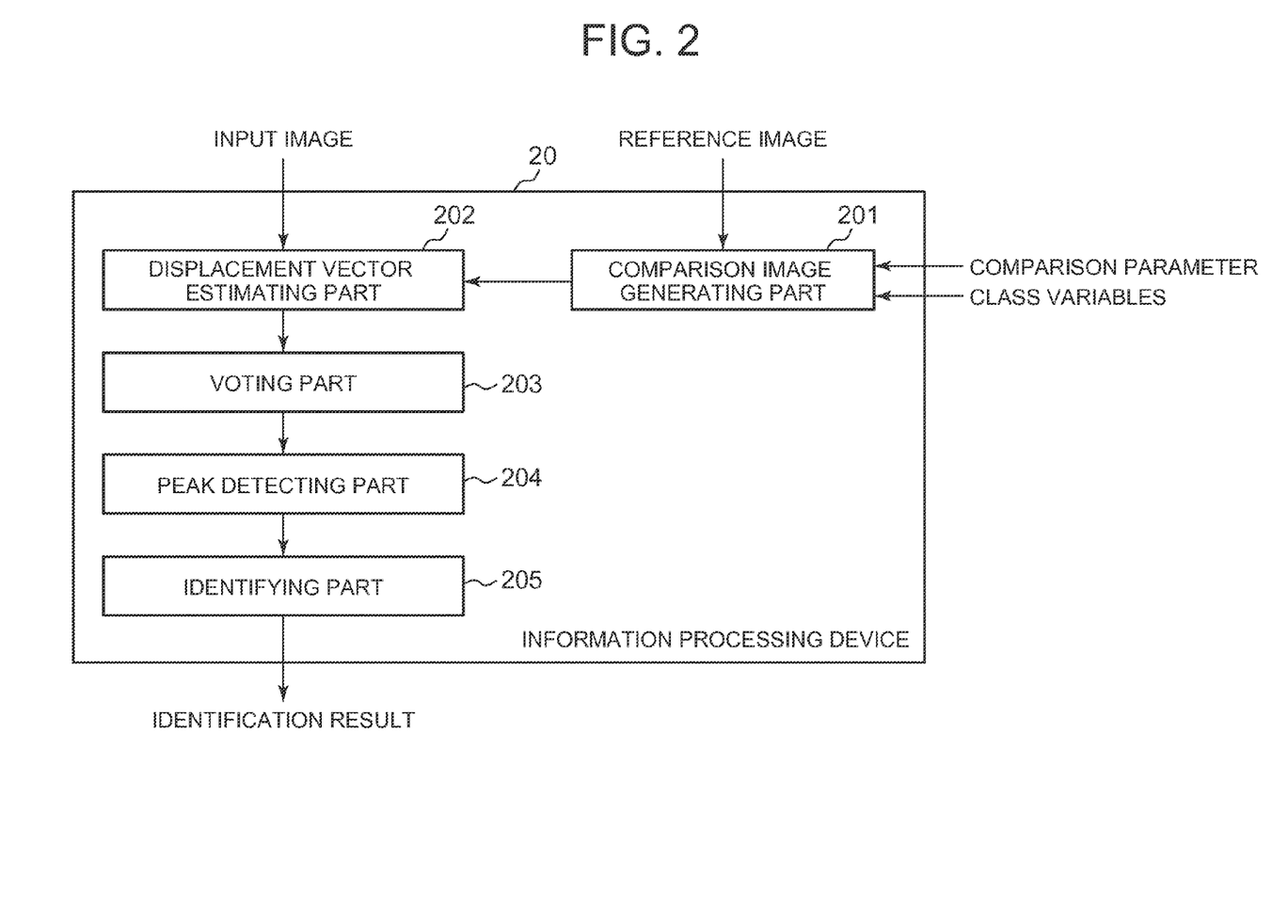
FIG. 2 is a block diagram illustrating an example of a configuration of the information processing device according to at least one exemplary embodiment.

FIG. 2 is a block diagram illustrating an example of a configuration of the information processing device 20 according to at least one exemplary embodiment.

The information processing device 20 may include a comparison image generating part 201, a displacement vector estimating part 202, a voting part 203, a peak detecting part 204, and an identifying part 205.

The comparison image generating part 201 may generate an image for comparison from the reference image (e.g., a high quality image), based on the comparison parameter. When the input image is an image with a quality lower than that of the reference image, the comparison image generating part 201 may generate a degraded image of the reference image (hereafter, referred to as degraded image), as the comparison image. The comparison parameter may be referred to as "degradation parameter".

In some instances, the comparison parameter (degradation parameter) may be such a parameter that the comparison image (degraded image) is generated to have the same level of image quality (for example, resolution) as the input image (e.g., low quality image).

For example, the degradation parameter may be a parameter representing the posture of the captured target, the resolution, the degree of blur, the point spread function, the compression rate, the lighting condition, the reflectance, the field of interlace, or the sensor noise, for degrading (transforming) the image.

An example of an operation of the comparison image generating part 201 will be described. For example, when the degradation parameter includes posture transformation, the comparison image generating part 201 may perform posture transformation of the reference image. When the degradation parameter includes the degree of blur, the comparison image generating part 201 may cause the reference image to blur according to the degree of blur. When the degradation parameter includes reduction of the resolution, compression of the image, or overlapping of a noise, the comparison image generating part 201 may reduce the resolution of the reference image, compress the reference image, or cause the noise to overlap the reference image according to the degradation parameter.

In some aspects, the comparison image generating part 201 may generate the comparison image corresponding to each of parameters included in the comparison parameter. In other aspects, the comparison image generating part 201 may generate one or multiple comparison images based on multiple parameters included in the comparison parameter. As described above, the comparison image generating part 201 may generate one or multiple comparison images (degraded images) corresponding to one or multiple parameters included in the comparison parameter from the reference image.

The comparison image generating part 201 may link (associate) the class variables to the generated comparison image (e.g., degraded image), the class variables being linked to (associated with) the reference image which is a base of the comparison image. A method of storing the association between the comparison image and the class variables may not be limited to a particular method. For example, the comparison image may include the class variables. For example, the comparison image generating part 201 may store the association relationship between the comparison image and the class variables in the storage unit.

The comparison image generating part 201 may store the comparison image (degraded image) in the storage unit. In some aspects, the various configuration parts of the information processing device 20 may fetch the comparison image from the storage unit.

The displacement vector estimating part 202 may execute the operation described below.

(1) Cutting-Out of Input Patches

The displacement vector estimating part 202 may cut out images (hereafter, referred to as "input patches") of sub-regions from the input image (e.g., low quality image) of the information processing device 20. The shapes of the input patches cut out by the displacement vector estimating part 202 may not be limited to a particular shape. For example, the displacement vector estimating part 202 may cut out a square region of a predetermined size such as a region of "five pixels by five pixels", as an input patch. For example, the displacement vector estimating part 202 may cut out a circular region as an input patch. For example, the displacement vector estimating part 202 may cut out an input patch having a shape designated by the user in advance. For example, the displacement vector estimating part 202 may cut out input patches in such a way that the regions of the input patches partially overlap each other.

The displacement vector estimating part 202 may obtain position information (for example, coordinates) of each input patch in the input image (low quality image). An expression format of the position information in the exemplary embodiment may not be limited to a particular format. In the following description, a vector expression may be used for the position information as an example.

The displacement vector estimating part 202 may store association between each of the input patches and the position information thereof.

The displacement vector estimating part 202 may store the input patches in the storage unit (for example, a memory). In some aspects, the displacement vector estimating part 202 may store the position information of the input patches together with the input patches.

(2) Cutting-Out of Comparison Patches (E.g., Degraded Patches)

The displacement vector estimating part 202 may cut out images (hereafter, referred to as a "comparison patch") of sub-regions from the comparison image (e.g., degraded image). The shapes of the comparison patches may be the same as the shapes of the input patches. This may be to allow the displacement vector estimating part 202 to calculate the degrees of differences between the input patches and the comparison patches, as will be described below. In some aspects, the shapes of the comparison patches may be different from the shapes of the input patches as long as the displacement vector estimating part 202 can calculate the degrees of differences between the input patches and the comparison patches.

In the description of the exemplary embodiment, since the comparison image is an image obtained by degrading the reference image, the comparison patches may be referred to as "degraded patches".

The displacement vector estimating part 202 may obtain position information (for example, coordinates) of each comparison patch in the comparison image (e.g., degraded image). As described above, in the description of the exemplary embodiment, the position information of the comparison patch may be represented in vector. The displacement vector estimating part 202 may store association between each of the comparison patches and the position information thereof.

The displacement vector estimating part 202 may store the comparison patches in the storage unit (for example, a memory). In some aspects, the displacement vector estimating part 202 may store the position information of the comparison patches together with the comparison patches.

The displacement vector estimating part 202 may link the class vectors linked to (associated with) the comparison image (e.g., degraded image), to the comparison patches.

(3) Calculation of Degree of Difference

The displacement vector estimating part 202 may calculate the degree of difference in each combination of the input patch and the comparison patch. The displacement vector estimating part 202 may search for the combination of patches with a small degree of difference.

A method of calculating the degree of difference which is used by the displacement vector estimating part 202 may not be limited to a particular method. For example, the displacement vector estimating part 202 may calculate the degree of difference by using one or combination of the sum of squared differences of pixel values of the input patch and the comparison patch, the sum of absolute values of the differences, and the normalized cross correlation of the pixel values (a method of calculating the degree of difference). For example, the displacement vector estimating part 202 may normalize the pixel values of the patches by using a histogram normalizing method, and calculate the degree of difference by using one or combination of the sum of the squared differences of the pixel values, the sum of the absolute values, and the normalized cross correlation (a second method of calculating the degree of difference). For example, the displacement vector estimating part 202 may calculate the degree of difference by using the weighted linear sum of the first method of calculating the degree of difference and the second method of calculating the degree of difference. For example, the displacement vector estimating part 202 may calculate the degree of difference by using a non-linear scale of distance between the input patch and the comparison patch. For example, the displacement vector estimating part 202 may calculate the histogram of oriented gradients of the patches and calculate the degree of difference by using one or combination of the sum of the squared differences, the sum of the absolute values of the differences, and the normalized cross correlation about the calculated histogram of oriented gradients.

In some aspects, the displacement vector estimating part 202 may calculate the degrees of differences between each of the input patches and all of the comparison patches. In other aspects, the displacement vector estimating part 202 may calculate the degrees of differences between each of the input patches and the comparison patches near (e.g., within a predetermined coordinate range) the position (e.g., coordinates) of the input patch. For example, the displacement vector estimating part 202 may calculate "L×M" degrees of differences, where the number of the input patches is L and the number of the comparison patches near each of the input patches is M.

The displacement vector estimating part 202 may store the calculated degrees of differences in the storage unit (for example, a memory).

(4) Estimation of Displacement Vector

The displacement vector estimating part 202 may estimate the displacement vectors between the input patches and the comparison patches. A method of estimating the displacement vectors may not be limited to a particular method. The displacement vector estimating part 202 may estimate the displacement vectors by using a general method. For example, the displacement vector estimating part 202 may use the method in International Patent Application Publication No. WO2011/083665, the content of which is incorporated by reference in its entirety.

As described above, the displacement vector estimating part 202 may cut out the input patches and the comparison patches, calculate the degrees of differences, and estimate the displacement vectors.

The voting part 203 may perform voting for the degrees of reliability of the class variables on a space (e.g., a voting space) determined by the class variables and the displacement vectors, based on the degrees of differences between the input patches and the comparison patches, the displacement vectors between the input patches and the comparison patches, and the class variables of the comparison patches.

In some aspects, the degrees of reliability may correspond to the weights of the class variables. The above-described processing of the voting part 203 may be weighted voting for the class variables.

The voting space may be a two-dimensional space represented by using the displacement vector and the class variable as coordinate axes.

In other aspects, the voting part 203 may perform voting for the degree of reliability of the class variable in the voting space for each of the input patches or each of the pixels in the input image. When the voting part 203 performs processing on the voting space for each of the pixels in the input image, the voting part 203 may execute the weighted voting by using the input patch including this pixel. In the following explanation, the description is given by using the input patch.

The voting part 203 may use the degrees of differences to select the comparison patch which is a target of processing, as will be described below.

Figure 3:
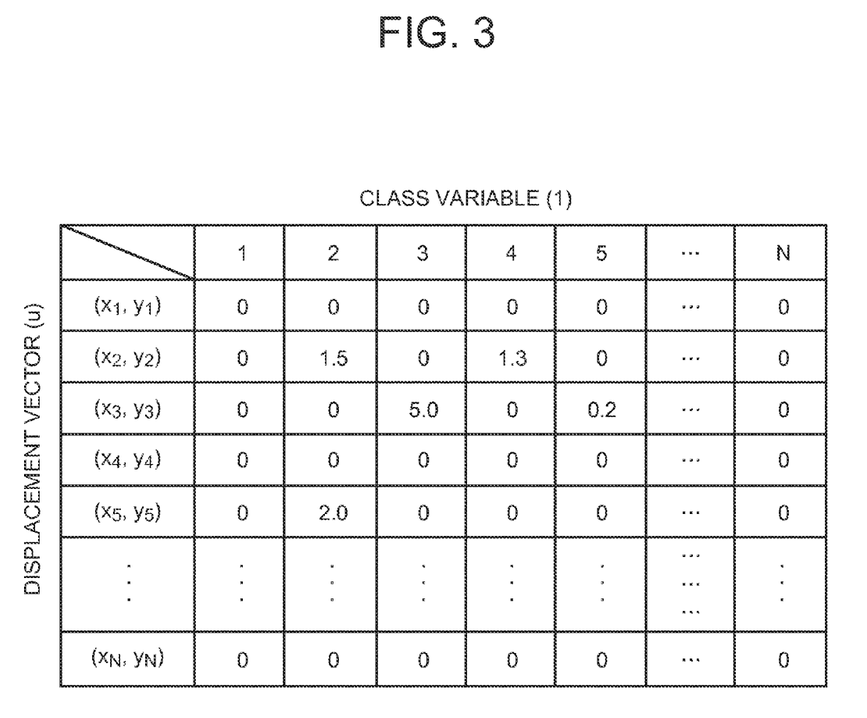
FIG. 3 is a view illustrating an example of a voting space according to at least one exemplary embodiment.

FIG. 3 is a view illustrating an example of the voting space according to at least one exemplary embodiment.

As illustrated in FIG. 3, the voting space may be a space in which the degrees of reliability corresponding to the class variables and the displacement vectors for the input patches are represented. In some aspects, the voting space may be a two-dimensional space in which the displacement vector and the class variable may be set as coordinate axes. Each of points in the voting space may represent the degree of reliability.

The images in the exemplary embodiment may be digital information. The displacement vectors may be discrete values. The class variables may be discrete values. In FIG. 3, the voting space may be represented by using a table format.

The class variables (l) in FIG. 3 may be classes of images as described above. For example, the class variables (l) in FIG. 3 may be class variables corresponding respectively to character images. For example, when the class variables (l) are class variables for alphabets (e.g., "A", "B", "C", . . . ), the row of "class variable (l)=1" may include the degrees of reliability corresponding to the character "A", and the row of "class variable (l)=2" may include the degrees of reliability corresponding to the character "B". The class variables (l) in FIG. 3 may be class variables corresponding respectively to face images.

The voting part 203 may perform voting for the degrees of reliability in the voting space.

In some aspects, the voting part 203 may execute the weighted voting such that the degrees of reliability of the class variables satisfying at least one of the following characteristics become high. The weights of the voting by the voting part 203 may be values calculated based on values set by the user in advance or on past data.

(1) The class variables linked to (associated with) the comparison patches corresponding to the input patches are biased to one or few types of the class variables.

(2) The comparison patches are cut out from the same position in the reference image.

(3) The image quality of the input patch is higher than those of other input patches.

(4) The input patch is near the center position of the recognition target.

(5) High quality images corresponding to the class variable are few.

The above-described characteristics may be described in detail below by using some examples.

(1) The voting part 203 may select the comparison patches whose degrees of differences from the input patches are within a predetermined top-level range. The voting part 203 may determine whether the class variables corresponding to the selected comparison patches are biased to one type of class variable. When the types of the class variables are biased to one type, the voting part 203 may execute the weighted voting such that the degree of reliability of an intersection of the one type of the class variable and the displacement vectors between the selected comparison patches and the input patches in the voting space is set higher. In some aspects, when the number of types of class variables corresponding to the comparison patches whose degrees of differences are within the predetermined top-level range is smaller than a predetermined number, the voting part 203 may execute the weighted voting such that the degrees of reliability of intersections of the class variables and the displacement vectors between the comparison patches and the input patches are set higher. For example, assume a case where displacement vectors between input patches and two comparison patches whose degrees of differences are in the top-level range are $(x_2, Y_2)$ and $(x_5, y_5)$, and the class variables (l) of the comparison variables are both 2. In this case, the voting part 203 may set the degrees of reliability of the intersection of the displacement vector $(x_2, Y_2)$ and the class variable (l)=2 and the intersection of the displacement vector $(x_5, y_5)$ and the class variable (l)=2 to higher degrees.

(2) The voting part 203 may select the comparison patches whose degrees of differences from the input patches are within a predetermined top-level range. The voting part 203 may determine whether the positions of the selected comparison patches are biased to a predetermined region in the reference image. When the positions are biased to the predetermined region, the voting part 203 may execute weighted voting such that the degrees of reliability of the intersections of the corresponding class variables and the displacement vectors between the selected comparison patches and the input patches in the voting space are set higher. In some aspects, the predetermined region may be a region set in the voting part 203 in advance. For example, the predetermined region may be a region of a predetermined size in the reference image. For example, the predetermined region may be a region including a predetermined position in the reference image.

(3) The voting part 203 may compare the image quality of one input patch with the image qualities of other input patches. When the image quality of the one input patch is higher than the image qualities of the other input patches, the voting part 203 may execute the weighted voting such that the degrees of reliability of the class variables corresponding to the comparison patches associated with the one input patch are set higher in the voting space. High image quality may refer to a case where the resolution of the input patch is higher than the average value of resolutions of all of the input patches by a predetermined value. The voting part 203 may set the degrees of reliability of the class variables corresponding to top-level comparison patches in a predetermined range to higher degrees.

(4) When the input patch is near the center position of the recognition target in the input image (e.g., a low quality image), the voting part 203 may execute the weighted voting such that the degrees of reliability of the class variables corresponding to the comparison patches associated with this input patch are set higher.

For example, near the center position of the recognition target may refer to the following range. The voting part 203 may calculate the center position of the recognition target in the input image by using general image recognition based on an image recognition part. The voting part 203 may determine that the input patch is near the center position when the distance between the calculated center position and the input patch is smaller than a predetermined threshold value.

In some aspects, the information processing device 20 may perform processing repeatedly. The voting part 203 may calculate the center position of the recognition target based on the recognition result in the previous processing.

(5) When the number of reference images corresponding to class variables which correspond to the comparison patches associated with the input patch is small, the voting part 203 may execute the weighted voting such that the degrees of reliability of these class variables are set higher.

For example, as a method of calculating the value of the degree of reliability for which the weighted voting is performed, the voting part 203 may use a voting weight function (L(u, l)) which is represented by Equation 1 described below and which takes the displacement vector (u) and the class variable (l) as arguments.

$$L(u, l) = \sum_{i=1}^{N} \sum_{k=1}^{K} g(u_i^k, u) \cdot \delta(l_i^k, l) \cdot w_k \cdot \phi_i \cdot q(l) \cdot \psi_i \quad \text{[Equation 1]}$$

The variables used in Equation 1 may be as described below.

"N" may represent the number of pixels in the input patch (or the input image).

"i" may represent a pixel number of a pixel in the input patch (or the input image).

"K" may represent the number of top-level comparison patches selected for the input patch corresponding to the position coordinates of the i-th pixel.

"k" may represent an individual number of one of top K comparison patches.

"$u_i^k$" may represent the displacement vector between the input patch including the i-th pixel of the input image and the k-th comparison patch corresponding to this input patch.

"$l_i^k$" may represent the class variable linked to (associated with) the k-th comparison patch associated with the input patch including the i-th pixel of the input image.

The function "g(x, y)" may be a function whose value increases as the absolute value (|x−y|) of the difference between the two arguments (x and y) decreases. For example, the function "g(x, y)" may be a Gaussian function in which the difference value of the two arguments (x, y) is used as an argument.

The function "δ(x, y)" may be a function which is set to "1" when the values of the two arguments (x, y) coincide with each other and which is set to "0" in cases other than that.

"$w_k$" may be a coefficient for applying a weight to the k-th comparison patch, and the higher the level of the selected comparison patch is, the greater the applied weight is. For example, "$w_k$" may be represented as described in Equation 2 below.

$$w_k = K - k \quad \text{[Equation 2]}$$

"ϕi" may be a coefficient for applying a weight, and the closer the vector "$v_i$" of the position coordinates of the i-th pixel in the input image is to the center vector "v" of the recognition target, the greater the applied weight is. For example, "ϕi" may be represented as described in Equation 3 below.

$$\phi_i = \exp\left[-\frac{\|v_i - v\|_2^2}{2v_0^2}\right] \quad \text{[Equation 3]}$$

In Equation 3, "$v_0$" may represent a parameter for determining a rate of decrease of the weight with respect to distance. For example, "$v_0$" may be a value stored in advance by the information processing device 20. Double vertical lines may indicate a norm. The subscript "2" attached to the double lines may indicate a secondary norm (Euclidian norm).

"q(l)" may represent a probability of the class variable (l) linked to the comparison patch with respect to all of the class variables linked to the entire reference image. "q(l)" may be correction of difference relating to the class variables in the reference image.

"$\Psi_i$" may represent a weight expressing the image quality of the input patch including the i-th pixel. The higher the image quality of the input patch is, the greater the value of "$\Psi_i$" is. For example, the voting part 203 may estimate the amount of sensor noise, the amount of compression noise, or the degree of blur in the input patch. For example, the voting part 203 may set "$\Psi_i$" such that the greater the sensor noise, the compression noise, or the degree of blur is, the smaller the value of "$\Psi_i$" is.

The voting part 203 may set the value of the voting weighted function "L(u, l)" represented as described above as the degree of reliability of the weighted vote, and cast a vote of this value to a position represented by the displacement vector (u) and the class variable (l) in the voting space.

For example, the degree of reliability corresponding to "displacement vector $(x_2, y_2)$-class variable (2)" in the voting space illustrated in FIG. 3 is "1.5".

The voting part 203 may smooth the value of the degree of reliability (L (u, l)) for which voting is performed in the voting space, with respect to the position vector (u) and/or the class variable (l).

The peak detecting part 204 may detect, for each of the displacement vectors (u), the maximum value (peak) in the degrees of reliability (for example, the values of function L(u, l)) in the voting space in which the voting part 203 have performed the weighted voting. The peak detecting part 204 may calculate the maximum value of the degree of reliability (probability) of each of the class variables (l) based on the detected maximum value (peak). For example, the degree of reliability "P(l)" may be represented as in Equation 4 described below.

$$P(l) = \max_u \left[ \frac{L(u, l)}{\sum_{u,l} L(u, l)} \right] \quad \text{[Equation 4]}$$

In some aspects, the peak detecting part 204 may calculate the degree of reliability of each of the class variables in the voting space based on the maximum values (peaks) of the respective displacement vectors (u).

For example, in the detection of the maximum value for the displacement vector $(x_2, x_2)$ in the voting space illustrated in FIG. 3, the peak detecting part 204 may detect the degree of reliability (1.5) of the class variable (l)=2 as the maximum value. For example, in the detection of the maximum value for the displacement vector $(x_3, x_3)$, the peak detecting part 204 may detect the degree of reliability (5.0) of the class variable (l)=3 as the maximum value. For example, in the detection of the maximum value for the displacement vector $(x_5, x_5)$, the peak detecting part 204 may detect the degree of reliability (2.0) of the class variable (l)=2 as the maximum value.

The peak detecting part 204 may calculate the degree of reliability "P(l)" of each class variable by using Equation 4.

For example, when the degree of reliability of the class variable (2) is to be calculated based on the values in the voting space illustrated in FIG. 3, the peak detecting part 204 may calculate the degree of reliability as in Equation 5 described below.

$$P(2)=2.0/(1.5+2.0)\approx 0.6 \quad \text{[Equation 5]}$$

When the degree of reliability of the class variable (3) is to be calculated based on the values of in the voting space illustrated in FIG. 3, the peak detecting part 204 may calculate the degree of reliability as in Equation 6 described below.

$$P(3)=5.0/(5.0)=1.0 \quad \text{[Equation 6]}$$

The degrees of reliability may be "scores" representing the reliability of the class variables. The degrees of reliability may be "voting values" of the voting part 203 for the voting result of the voting part 203.

The degrees of reliability may be values for the class variables, and the class variables may be associated with the reference image, the comparison image, and the comparison patches. In some aspects, the calculated degrees of reliability may be the degrees of reliability of the reference image, the comparison image, and the comparison patches.

The identifying part 205 may identify the value of the class variable whose degree of reliability (probability) "P(l)" calculated by the peak detecting part 204 is great. The identifying part 205 may output the determined value of the class variable as an identification value.

The class variable which is the identification result may be the class variable of the recognition target in the input image. The information processing device 20 can identify (recognize) the recognition target in the input image as described above. In this exemplary embodiment, when the input image is a degraded or low quality image, the information processing device 20 can recognize the recognition target in the degraded or low-quality image. The degraded or low quality image herein may not be limited to an image which is low in quality or degraded due to geometric transformation.

As described above, the information processing device 20 of the exemplary embodiment can achieve recognition of an image in not only an image which is low in quality or degraded due to geometric transformation.

The number of class variables output by the identifying part 205 may not be limited to a particular number. For example, the identifying part 205 may output the value of the class variable whose degree of reliability (probability) "P(l)" is the greatest. For example, when the peak detecting part 204 calculates the results of Equation 5 and Equation 6, the identifying part 205 may output the class variable of "3". For example, when the class variables are those for the alphabets (A, B, C, . . . ) used in the above-described description, the identifying part 205 may output the class variable of the character "C".

The identifying part 205 may output the values of the class variables whose values of the degrees of reliability (e.g., probabilities) "P(l)" are great enough to be within a predetermined range.

The value output by the identifying part 205 may not be limited to the value of class variable and the value of degree of reliability (possibility) "P(l)" may be output. In some aspects, the degree of reliability (possibility) "P(l)" may be used as "score" or "weight" indicating the reliability of the identification result.

[Description of Operations]

An operation of the information processing device 20 in the exemplary embodiment is described in detail with reference to the drawings.

Figure 4:
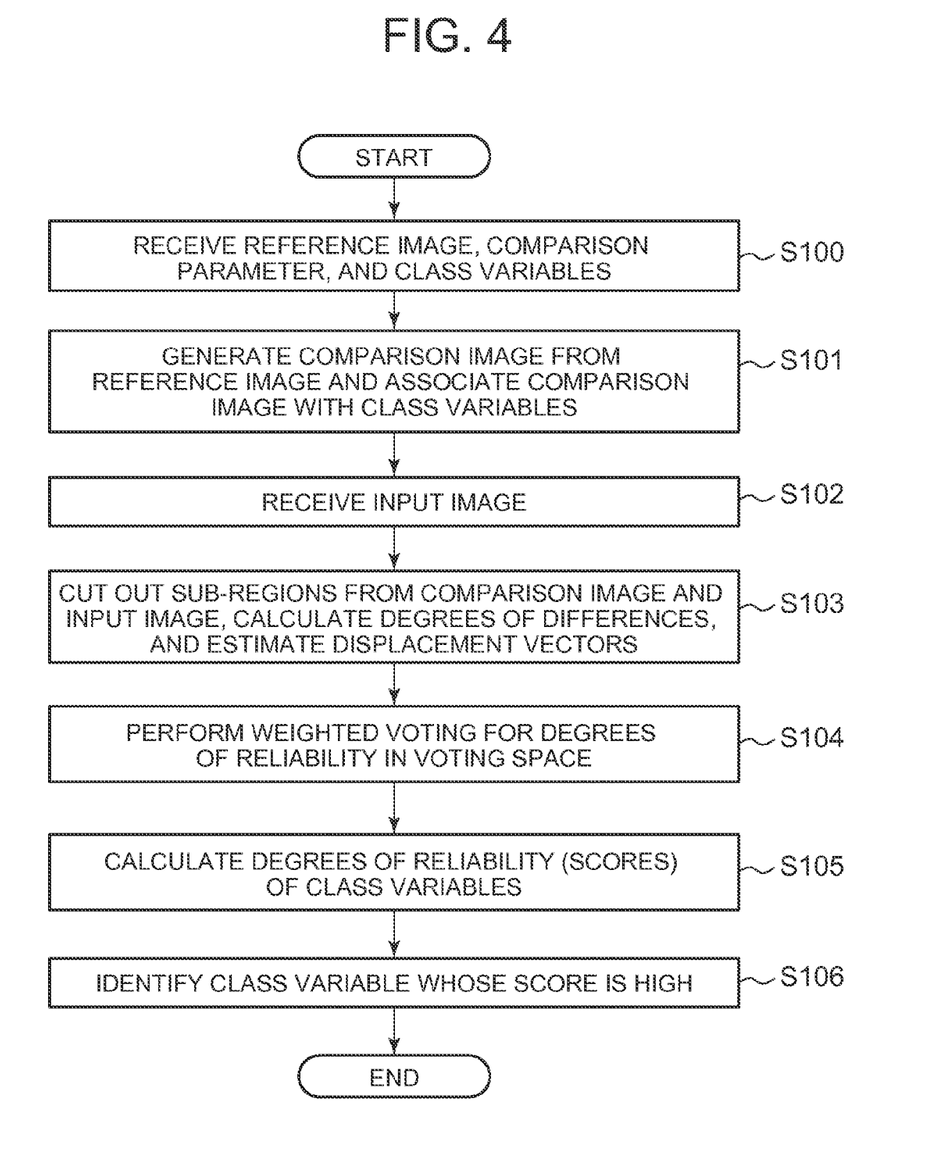
FIG. 4 is a flowchart depicting an example of an operation of the information processing device according to at least one exemplary embodiment.

FIG. 4 is a flowchart depicting an example of the operation of the information processing device 20 according to at least one exemplary embodiment.

In the step S100, the comparison image generating part 201 may receive the reference image (high quality image), the comparison parameter (degradation parameter), and the class variables.

In the step S101, the comparison image generating part 201 may generate the comparison image (e.g., a degraded image) based on the reference image (e.g., a high quality image) and the comparison parameter (e.g., a degradation parameter). The comparison image generating part 201 may associate the comparison image (degraded image) and the class variables with each other.

In the step S102, the displacement vector estimating part 202 may receive the input image (e.g., a low quality image).

In the step S103, the displacement vector estimating part 202 may cut out images of sub-regions (the comparison patches and the input patches) from the comparison image (e.g., a degraded image) and the input image (e.g., a low quality image). The displacement vector estimating part 202 may calculate the degrees of differences between the input patches and the comparison patches and estimate the displacement vectors between the input patches and the comparison patches.

In the step S104, the voting part 203 may perform the weighted voting for the degrees of reliability of the class variables, based on the degrees of differences and the displacement vectors, in the voting space represented by the displacement vectors and the class variables.

In the step S105, the peak detecting part 204 may calculate the degrees of reliability (voting value or score) of the class variables, based on the maximum values of the class variables for the displacement vectors (u).

In the step S106, the identifying part 205 may identify the class variable whose degree of reliability (score) is high.

In some aspects, the identified class variable may be the class variable of the identification target in the input image, i.e. the recognition result.

[Description of Effects]

As described above, the information processing device 20 of the exemplary embodiment can provide such an effect that the recognition accuracy in the transformed (for example, degraded or low-quality) image is improved.

Such an effect may be obtained due to the following reasons.

The comparison image generating part 201 may generate the comparison image (degraded image) having the same image quality as the input image (low quality image) from the reference image (high quality image). The displacement vector estimating part 202 may calculate the degrees of differences between the input patches which are patches of the input image and the comparison patches which are patches of the comparison image. As described above, since the information processing device 20 calculates the degrees of differences by using the comparison image, the information processing device 20 can calculate the degrees of differences in which differences in appearance occurring due to image quality change in the input image are reduced. As a result, the information processing device 20 can improve the recognition accuracy even for a transformed image in which the appearance changes.

The voting part 203 may perform voting for the degrees of reliability of the class variables, based on the degrees of differences, in the voting space represented by the class variables and the displacement vectors. The peak detecting part 204 may detect the peak of the degrees of reliability for which the voting is performed. The identifying part 205 may identify the class variable based on the peak. This processing performed by the voting part 203, the peak detecting part 204, and the identifying part 205 may be processing capable of handling geometric transformation. Accordingly, the information processing device 20 can recognize an image even in a case where transformation is one based on geometric transformation. In other words, the information processing device 20 can improve the accuracy of image recognition in cases of the geometric transformation and transformation other than the geometric transformation.

Modified Example

The information processing device 20 described above may be configured as described below.

For example, the configuration parts of the information processing device 20 may include a hardware circuit.

In the information processing device 20, the configuration parts of the information processing device 20 may be arranged by using multiple information processing devices connected to each other via a network or a bus.

In the information processing device 20, multiple configuration parts may include at least one piece of hardware.

The information processing device 20 may be implemented as a computer device including a CPU (Central Processing Unit), a ROM (Read Only Memory), and a RAM (Random Access Memory). The information processing device 20 may be implemented as a computed device including an input/output circuit (IOC) and a network interface circuit (NIC) in addition to the configuration described above.

Figure 5:
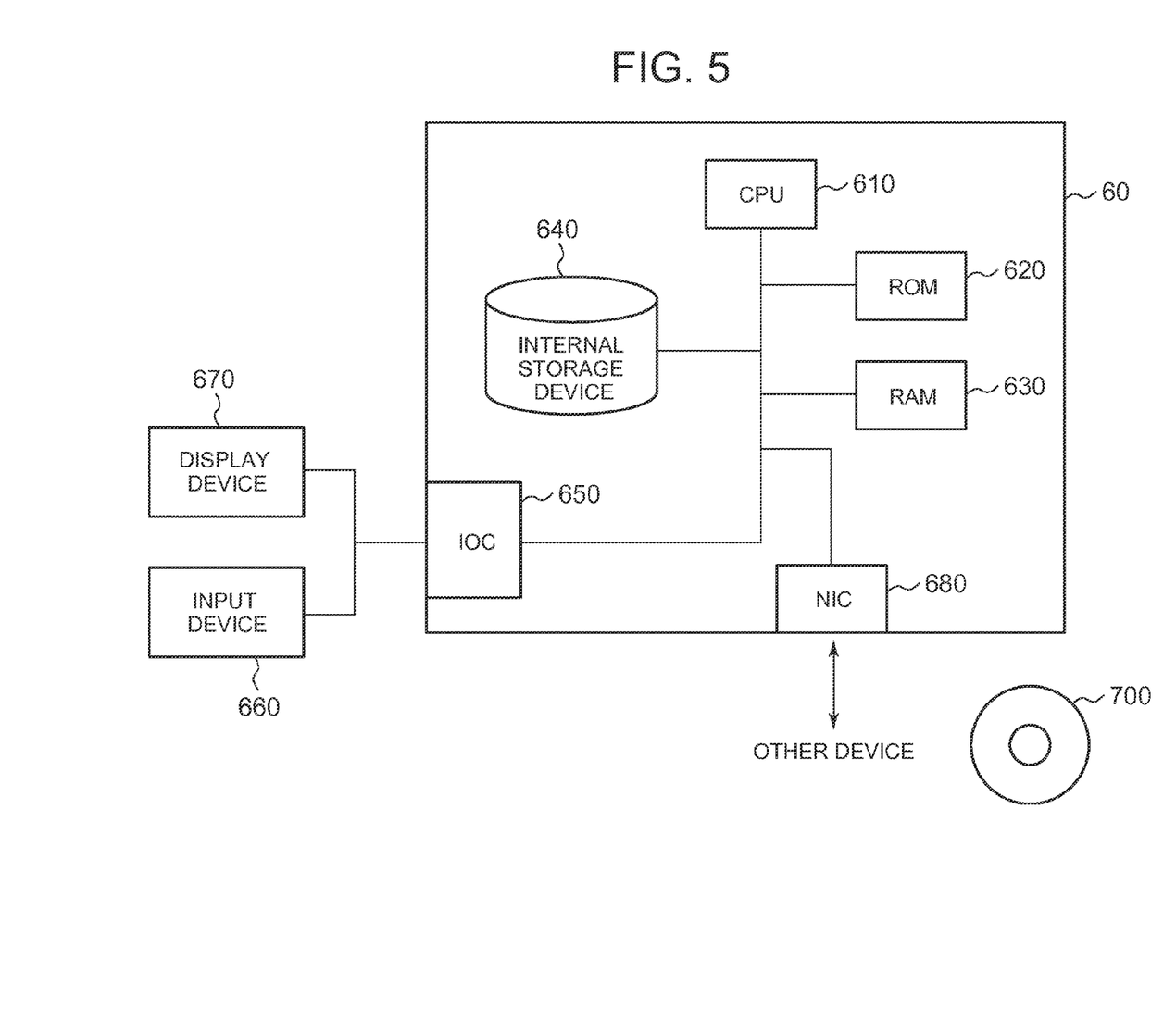
FIG. 5 is a block diagram illustrating an example of a configuration of an information processing device according to at least one exemplary embodiment.

FIG. 5 is a block diagram illustrating an example of the configuration of an information processing device 60 according to at least one exemplary embodiment.

The information processing device 60 may include a CPU 610, a ROM 620, a RAM 630, an internal storage device 640, an IOC 650, and a NIC 680, and configure a computer device.

The CPU 610 may read a program from the ROM 620. The CPU 610 may control the RAM 630, the internal storage device 640, the IOC 650, and the NIC 680, based on the read program. A computer including the CPU 610 may control these configuration parts to implement the functions of the comparison image generating part 201, the displacement vector estimating part 202, the voting part 203, the peak detecting part 204, and the identifying part 205 which are illustrated in FIG. 2.

The CPU 610 may use the RAM 630 or the internal storage device 640 as a temporarily storage for the program in a case of implementing the functions.

The CPU 610 may read the program included in a storage medium 700 which stores the program in such a way that the program is readable by a computer, by using a storage media reading device. The CPU 610 may receive the program from an external device via the NIC 680, store the program in the RAM 630, and operate based on the stored program.

The ROM 620 may store the program to be executed by the CPU 610 and fixed data. For example, the ROM 620 may be a P-ROM (Programmable ROM) or a flash ROM.

The RAM 630 may temporarily store the program to be executed by the CPU 610 and the data. For example, the RAM 630 may be a D-RAM (Dynamic RAM).

The internal storage device 640 may store the data and program which are to be saved in the information processing device 60 for a long period. The internal storage device 640 may operate as a temporary storage device of the CPU 610. For example, the internal storage device 640 may be a hard disk drive, an optical disc drive, a SSD (solid state drive), or a disc array device.

For example, the ROM 620 and the internal storage device 640 may be non-volatile storage media. For example, the RAM 630 may be a volatile storage medium. The CPU 610 can operate based on the program stored in the ROM 620, the internal storage device 640, or the RAM 630. In some aspects, the CPU 610 can operate by using the non-volatile recording medium or the volatile recording medium.

The IOC 650 may relay data between the CPU 610 and each of an input device 660 and a display device 670. For example, the IOC 650 may be an IO interface card or a USB (Universal Serial Bus) card.

The input device 660 may be a device which receives an input instruction from an operator of the information processing device 60. For example, the input device 660 may be a keyboard, a mouse, or a touch panel.

The display device 670 may be a device which displays information to the operator of the information processing device 60. For example, the display device 670 may be a liquid-crystal display.

The NIC 680 may relay data exchange with an external device via a network. For example, the NIC 680 may be a LAN (Local Area Network) card.

The same effects as those of the information processing device 20 can be obtained in the information processing device 60 configured as described above.

The reason for this may be because the CPU 610 of the information processing device 60 can implement the same function as the information processing device 20, based on the program.

Second Exemplary Embodiment

A second exemplary embodiment will be described with reference to the drawings.

In the second exemplary embodiment, an output image corresponding to the input image may be composited, based on the degree of reliability calculated in the first exemplary embodiment.

[Description of Configuration]

A configuration of an information processing device 21 according to at least one exemplary embodiment will be described with reference to the drawings.

Figure 6:
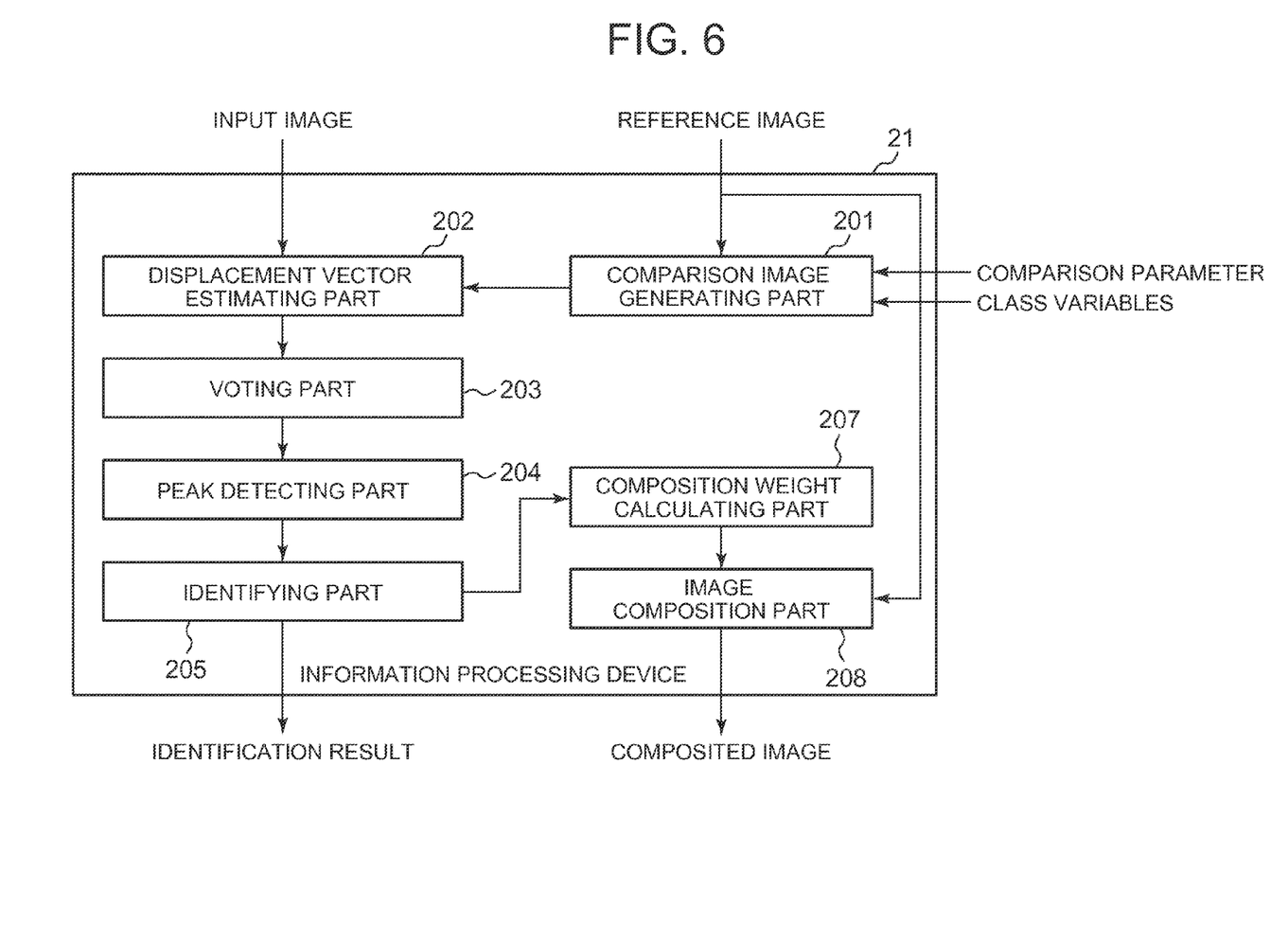
FIG. 6 is a block diagram illustrating an example of a configuration of an information processing device according to at least one exemplary embodiment.

FIG. 6 is a block diagram illustrating an example of the configuration of the information processing device 21 according to at least one exemplary embodiment.

As illustrated in FIG. 6, the information processing device 21 in the exemplary embodiment may include a composition weight calculating part 207 and an image composition part 208 in addition to the configuration of the information processing device 20 in the first exemplary embodiment.

The configuration of the information processing device 21 other than the composition weight calculating part 207 and the image composition part 208 may be the same as that in the first exemplary embodiment. The composition weight calculating part 207 and the image composition part 208 will be described.

The composition weight calculating part 207 may use the degrees of reliability (for example, P(l) in the first exemplary embodiment) of the class variables calculated by the identifying part 205 to determine "composition weights" for the comparison patches corresponding to the input patches. In some aspects, the composition weight calculating part 207 may set a weight for each comparison patch as "composition weight" such that the higher the degree of reliability of a class variable to which the comparison patch belongs is, the greater the value of the weight is. For example, the composition weight calculating part 207 may use the degree of reliability of the class variable corresponding to the comparison patch as the composition weight of the comparison patch. For example, the composition weight calculating part 207 may calculate the "composition weight" by substituting the degree of reliability of the class variable corresponding to the comparison patch into a monotonically increasing function determined in advance.

In other words, the composition weight calculating part 207 may calculate the composition weights of the comparison patches based on the degrees of reliability of the class variables calculated by the identifying part 205.

Based on the composition weights of the comparison patches calculated in the composition weight calculating part 207 and the reference image (first high quality image) corresponding to the comparison patches, the image composition part 208 may composite an output image (second high quality image) with the same image quality as the reference image (first high quality image).

The method in which the image composition part 208 composites the output image may not be limited to a particular method. For example, the image composition part 208 can composite the output image as described below.

The image composition part 208 may cutout images (hereafter, referred to as "reference patches") of sub-regions in the reference image (first high quality image) corresponding to the comparison patches. The image composition part 208 may set the composition weights of the comparison patches determined by the composition weight calculating part 207 to a values (composition weights) of the reference patches corresponding to the comparison patches. The image composition part 208 may perform alpha (a) blending on the comparison patches by using the a values of the comparison patches, and composite the output image.

The image composition part 208 may composite the output image as described below.

The image composition part 208 may determine the composition weights determined for the comparison patches as data terms of an energy function of Markov random field. The image composition part 208 may determine discontinuity of the reference patches corresponding to the comparison patches as a smoothing term of the energy function, the comparison patches corresponding to the input patches each including a pixel of the input image and pixels adjacent thereto. The image composition part 208 may composite the output image such that the energy function of Markov random field is minimized.

The reference patches may be patches of the reference image received by the comparison image generating part 201. The image quality (resolution) of the output image composited by the image composition part 208 may be about the same as that of the reference image (high quality image) received by the comparison image generating part 201.

In some aspects, the image composition part 208 may composite the output image with about the same image quality as the reference image received by the comparison image generating part 201, based on the composition weights calculated by the composition weight calculating part 207.

[Description of Operation]

An operation of the information processing device 21 according to at least one exemplary embodiment will be described with reference to the drawings.

Figure 7:
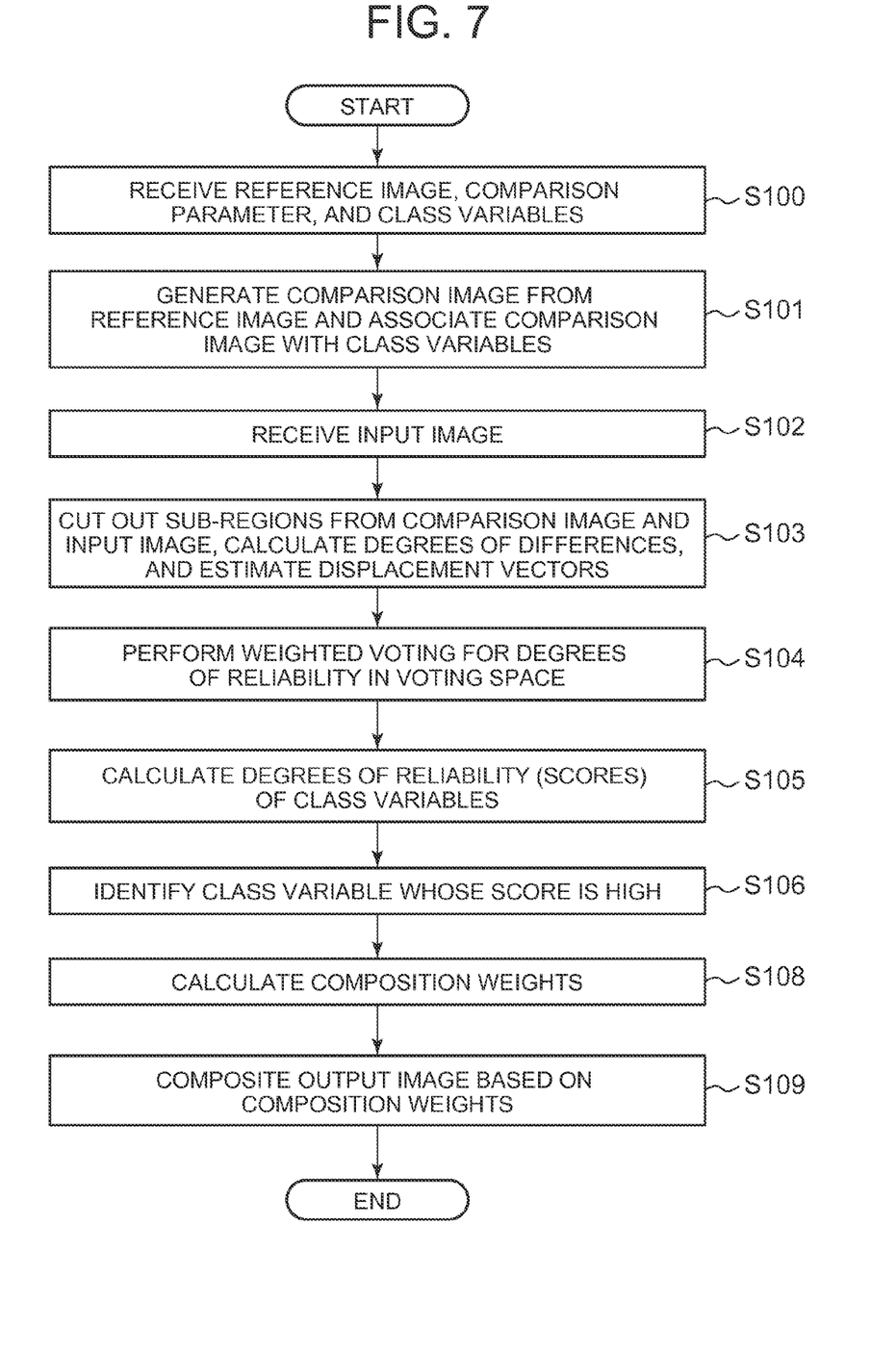
FIG. 7 is a flowchart depicting an example of an operation of the information processing device according to at least one exemplary embodiment.

FIG. 7 is a flowchart depicting an example of the operation of the information processing device 21 according to at least one exemplary embodiment.

In the operation of the information processing device 21 illustrated in FIG. 7, steps S108 and S109 may be executed in addition to the operation of the information processing device 20 illustrated in FIG. 4.

An operation of the information processing device 20 in accordance with at least one exemplary embodiment will be described.

After step S106, in the step S108, the composition weight calculating part 207 may calculate the composition weights to be used in the composition of the reference patches, based on the degrees of reliability (e.g., the weight or score) of the class variables calculated by the identifying part 205.

In the step S109, the image composition part 208 may composite the output image, based on the composition weights and the reference patches. The output image composited by the image composition part 208 may be a reconstructed image (second high quality image) of the input image (low quality image).

[Description of Effects]

In addition to the effects of the information processing device 20 in the first exemplary embodiment, the information processing device 21 of the exemplary embodiment can provide such an effect that the high quality output image corresponding to the input image can be composited.

Such an effect may be obtained due to the following reasons.

The composition weight calculating part 207 may calculate the composition weights of the comparison patches corresponding to the input patches by using the degrees of reliability calculated by the identifying part 205. The image composition part 208 may composite the output image, based on the composition weights and the reference patches corresponding to the comparison patch. In some aspects, the reference patches may be patches cut out from the reference image received by the comparison image generating part 201. Accordingly, the image composition part 208 can reconstruct the input image (e.g., a low quality image) into the output image (e.g., a second high quality image) with about the same image quality (e.g., resolution) as the reference image (first high quality image) received by the comparison image generating part 201.

The disclosure of the present application may not be limited by the embodiments described above. The configurations and details of the disclosure of the present application can be changed in various ways which can be understood by those skilled in the art, within the scope of the disclosure of the present application.

The invention claimed is:

1. An information processing device comprising:
a memory storing instructions; and
at least one processor configured to process the instructions to:
generate a comparison image by transforming a reference image,
associate the comparison image with a class variable representing an object included in the reference image,
calculate a degree of difference between an input patch which is an image representing a sub-region of an input image and a comparison patch which is an image representing a sub-region of the comparison image,
estimate a displacement vector between the input patch and the comparison patch,
calculate a first degree of reliability corresponding to the displacement vector and the class variable on the basis of the displacement vector and the degree of difference,
calculate a second degree of reliability for each comparison patch on the basis of the first degree of reliability, and
identify the object is represented by the class variable associated with the comparison image including the comparison patch whose second degree of reliability is greater than a predetermined threshold value, as a recognition target.

2. The information processing device according to claim 1, wherein the at least one processor is further configured to process the instructions to
calculate the first degree of reliability by executing voting a value calculated for each the displacement vector and each the class variable in a voting space determined by the displacement vector and the class variable.

3. The information processing device according to claim 2, wherein the at least one processor is further configured to process the instructions to
calculate the first degree of reliability by using the input patch and the comparison patch whose degree of difference is satisfied to a predetermined condition.

4. The information processing device according to claim 3, wherein the at least one processor is further configured to process the instructions to
execute weighted voting such that the first degree of reliability of the class variable of the comparison patch corresponding to the input patch is set higher than that of the others in response to the comparison patches whose degree of difference between the input patch is satisfied to the predetermined condition having predetermined types of the class variable.

5. The information processing device according to claim 3, wherein the at least one processor is further configured to process the instructions to
execute weighted voting such that the first degree of reliability of the class variable of the comparison patch corresponding to the input patch is set higher than that of the others in response to the comparison patches whose degree of difference between the input patch is satisfied to the predetermined condition being included in a predetermined region of the comparison image.

6. The information processing device according to claim 2, wherein the at least one processor is further configured to process the instructions to
execute weighted voting such that the first degree of reliability of the class variable of the comparison patch corresponding to the input patch is set higher than that of the others in response to an image quality of the input patch being higher than image qualities of the other input patches by a predetermined value.

7. The information processing device according to claim 2, wherein the at least one processor is further configured to process the instructions to
execute weighted voting such that the first degree of reliability of the class variable of the comparison patch corresponding to the input patch is set higher than that of the others in response to the input patch being within a predetermined range from a center position of the recognition target.

8. The information processing device according to claim 2, wherein the at least one processor is further configured to process the instructions to
execute weighted voting such that the first degree of reliability of the class variable of the comparison patch corresponding to the input patch is set higher than that of the others in response to the number of the reference images associated with the class variable being smaller than a predetermined number.

9. The information processing device according to claim 1, wherein the at least one processor is further configured to process the instructions to:

calculate a composition weight for the comparison patch corresponding to the input patch by using the second degree of reliability, and composite an output image for the input image, on a basis of the calculated composition weight and the reference image.

10. An information processing apparatus, comprising:

the information processing device according to claim 1;

a memory storing instructions; and at least one processor configured to process the instructions to:

transmit reference images to the information processing device, transmit an input image to the information processing device, set a comparison parameter for transformation from a reference image to a comparison image for the information processing device, set the class variable for the information processing device, and output the class variable identified to be the recognition target by the information processing device.

11. An information processing method comprising:

generating a comparison image by transforming a reference image;

associating the comparison image with a class variable representing an object included in the reference image;

calculating a degree of difference between an input patch which is an image representing a sub-region of an input image and a comparison patch which is an image representing a sub-region of the comparison image;

estimating a displacement vector between the input patch and the comparison patch;

calculating a first degree of reliability corresponding to the displacement vector and the class variable on the basis of the displacement vector and the degree of difference;

calculating a second degree of reliability for each comparison patch on the basis of the first degree of reliability; and identifying the object is represented by the class variable associated with the comparison image including the comparison patch whose second degree of reliability is greater than a predetermined threshold value, as a recognition target.

12. The information processing method according to claim 11, further comprising:

calculating the first degree of reliability by executing voting a value calculated for each the displacement vector and each the class variable in a voting space determined by the displacement vector and the class variable.

13. The information processing method according to claim 12, further comprising:

calculating the first degree of reliability by using the input patch and the comparison patch whose degree of difference is satisfied to a predetermined condition.

14. The information processing method according to claim 11, further comprising:

calculating a composition weight for the comparison patch corresponding to the input patch by using the second degree of reliability, and compositing an output image for the input image, on a basis of the calculated composition weight and the reference image.

15. A non-transitory computer-readable storage medium storing instructions that when executed by a computer enable the computer to implement a method comprising:

generating a comparison image by transforming a reference image;

associating the comparison image with a class variable representing an object included in the reference image;

calculating a degree of difference between an input patch which is an image representing a sub-region of an input image and a comparison patch which is an image representing a sub-region of the comparison image;

estimating a displacement vector between the input patch and the comparison patch;

calculating a first degree of reliability corresponding to the displacement vector and the class variable on the basis of the displacement vector and the degree of difference;

calculating a second degree of reliability for each comparison patch on the basis of the first degree of reliability; and identifying the object is represented by the class variable associated with the comparison image including the comparison patch whose second degree of reliability is greater than a predetermined threshold value, as a recognition target.

16. The non-transitory computer-readable storage medium according to claim 15, wherein the method further comprises:

calculating the first degree of reliability by executing voting a value calculated for each the displacement vector and each the class variable in a voting space determined by the displacement vector and the class variable.

17. The non-transitory computer-readable storage medium according to claim 16, wherein the method further comprises:

calculating the first degree of reliability by using the input patch and the comparison patch whose degree of difference is satisfied to a predetermined condition.

18. The non-transitory computer-readable storage medium according to claim 15, wherein the method further comprises:

calculating a composition weight for the comparison patch corresponding to the input patch by using the second degree of reliability, and compositing an output image for the input image, on a basis of the calculated composition weight and the reference image.

* * * * *